United States Patent [19]

Tomita et al.

[11] 4,396,565

[45] Aug. 2, 1983

[54] METHOD FOR PRODUCING A FILTER

[75] Inventors: Masahiro Tomita, Anjyo; Masao Wakayama, Nagoya, both of Japan

[73] Assignee: Nippon Soken, Inc., Nishio, Japan

[21] Appl. No.: 294,780

[22] Filed: Aug. 20, 1981

[30] Foreign Application Priority Data

Aug. 21, 1980 [JP] Japan .............................. 55/115697
Sep. 16, 1980 [JP] Japan .............................. 55/128894

[51] Int. Cl.³ .................................................. B29H 7/20
[52] U.S. Cl. .......................................... 264/44; 264/59; 264/DIG. 44
[58] Field of Search ............ 264/44, 59, 317, DIG. 44

[56] References Cited

U.S. PATENT DOCUMENTS

| | | | |
|---|---|---|---|
| 2,506,244 | 5/1950 | Stopka | 264/DIG. 44 |
| 3,090,094 | 5/1963 | Schwartzwaider et al. | 264/44 |
| 3,097,930 | 7/1963 | Holland | 264/44 |
| 3,111,396 | 11/1963 | Ball | 264/44 |
| 3,533,753 | 10/1970 | Berger | 264/44 |
| 3,822,335 | 7/1974 | Cohen | 264/317 |
| 3,845,181 | 10/1974 | Ravault | 264/44 |
| 3,877,973 | 4/1975 | Ravault | 264/44 |
| 3,907,579 | 9/1975 | Ravault | 264/44 |
| 4,056,586 | 11/1977 | Pryor et al. | 264/44 |

Primary Examiner—Donald E. Czaja
Assistant Examiner—W. Thompson
Attorney, Agent, or Firm—Cushman, Darby & Cushman

[57] ABSTRACT

A method for producing a filter having partially different apparent densities comprises the steps of assembling at least two kinds of foamed bodies having different cell densities, which are formed of an organic compound such as urethane, into a three dimensional structure, immersing the obtained composite body into a slurry composed of ceramic such as cordierite so that the slurry is attached to the surface of the composite body, and firing the composite body to which the slurry is attached, to burn off the foamed bodies. By selecting the portion to be formed into high density, mechanical strength and exhaust gas purifying efficiency of the filter can be improved.

16 Claims, 7 Drawing Figures

METHOD FOR PRODUCING A FILTER

BACKGROUND OF THE INVENTION

The present invention relates to a method for producing a filter for purifying exhaust gases and the like which are discharged from an internal combustion engine of an automobile or the like.

Conventionally, a ceramic honeycomb structure carrying oxidizing catalyst has been employed as one example of the filter. When the ceramic honeycomb structure carrying oxidizing catalyst is disposed within the exhaust gas system of the automobile, open passages of the honeycomb structure extend in the same direction as the flowing direction of the exhaust gas. Therefore, the exhaust gas flows through the open passages of the honeycomb structure in a straight line without striking against the walls of the open passages. As a result, fine particles contained within the exhaust gas are not sufficiently contacted with the oxidizing catalyst so that the exhaust gas purifying efficiency becomes poor.

Also a porous ceramic body has been used as the filter for purifying the exhaust gas. Since the open passages of this filter extend in various directions and the contact area with the exhaust gas is large, the purifying efficiency is good. But mechanical strength against vibrations or the like is remarkably inferior to that of the filter composed of the ceramic honeycomb structure.

Accordingly, one object of the present invention is to provide a filter made of porous ceramic, having improved mechanical strength and exhaust gas purifying efficiency, which is used for purifying exhaust gases discharged from an internal combustion engine of a vehicle or the like.

Another object of the present invention is to provide a method for producing a filter composed of a porous ceramic body for purifying exhaust gases, which is partially provided with a portion having higher apparent density so as to improve mechanical strength thereof.

Still another object of the present invention is to provide a method for producing a filter composed of a porous ceramic body, which is partially provided with a portion having higher apparent density so as to improve exhaust gas purifying efficiency.

DESCRIPTION OF THE DRAWINGS

Other objects and advantages of the invention will become apparent from the following description of embodiments with reference to the accompanying drawings wherein.

SUMMARY OF THE INVENTION

According to the present invention, a filter having partially different apparent densities can be obtained by assembling at least two kinds of foamed bodies having different cell densities, which are formed of an organic compound such as urethane, into a three dimensional structure, immersing the obtained composite body into a slurry composed of ceramic such as cordierite so that the slurry is attached to the surface of the composite body and firing the composite body to which the slurry is attached to burn off the foamed bodies.

By selecting the portion to be formed into high density, mechanical strength and exhaust gas purifying efficiency of the filter can be improved.

DETAILED DESCRIPTION OF THE INVENTION

Figure 1:
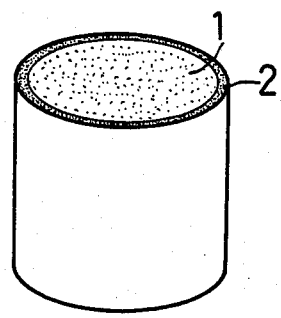
FIG. 1 is a perspective view of a porous ceramic body which is obtained by a first embodiment of the present invention.

FIG. 1 shows a filter composed of a porous ceramic body which is obtained by a first embodiment of the present invention.

The filter of the first embodiment is composed of a porous central portion 1, having such a low apparent density that exhaust gas can be flowed therethrough, and an outer portion 2 having an apparent density higher than that of the central portion 1. The central portion 1 has, three dimensional network structure provided with a large number of pores communicated with one another while in the outer portion 2 such pores as described above scarcely exist. After the central portion 1 is made to carry Pt-Rh catalyst, the filter is accomodated within a metallic casing and is installed in the exhaust gas passage.

One example of the method for producing the above described filter will be explained hereinafter.

At first, a columnar polyurethane foamed body having a three dimensional network structure and of which cell density was about 13 mesh (cell/in.) and a sheet-shaped polyurethane foamed body having three dimensional network structure and of which cell density was 40 mesh, were prepared.

Then, the sheet-shaped polyurethane foamed body was wound round the columnar polyurethane foamed body and they were fixed to each other by means of adhesive tape to form a composite body.

Next, the obtained composite body of which cell density was different between the central portion and the outer portion thereof, was immersed into a slurry bath which was prepared by mixing 1500 g of cordierite powder, 60 g of methyl cellulose and 2500 ml of water so that the slurry was attached to the network structure of the composite body. Then, the obtained composite body was taken out of the slurry bath and excessive slurry was blown off from the composite body by compressed air, and the composite body was dried at 100° C. for 3 hours.

These operations were repeated seven times. Then, the composite body was fired at 1300° to 1480° C. for 5 hours.

As a result, urethane foam was burnt off and a porous ceramic body as shown in FIG. 1 was obtained.

Figure 7:
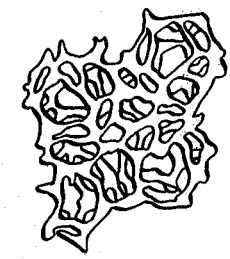
FIG. 7 is a perspective view of a ceramic foamed body.

The central portion 1 of the obtained porous ceramic body is provided with narrow open passages through which exhaust gases flow, as shown in FIG. 7. In the outer portion 2, the cavities are clogged so that such open passages as described above scarcely exist.

Therefore, the outer portion 2 having high apparent density serves to improve mechanical strength of the obtained ceramic body.

Furthermore, since the whole porous ceramic body is made of the same material, cracks do not occur during the firing step.

Compression strength of the filter of the porous ceramic body was 100 to 150 kg/cm$^2$ in the axial direction thereof and 50 to 100 kg/cm$^2$ in the radial direction thereof.

When the filter composed of the above described porous ceramic body was installed in the exhaust gas passage, it was observed that the same exhaust gas purifying efficiency as that of the conventional honeycomb structured filter of which cell density was 400 mesh could be obtained by the filter of the present invention, of which volume was 60% of that of the conventional filter.

Figure 2:
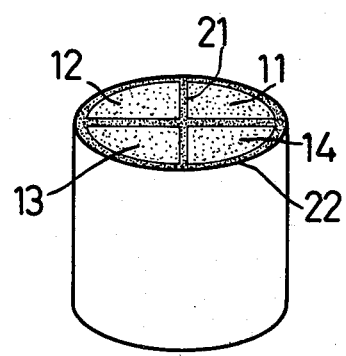
FIG. 2 is a perspective view of a porous ceramic body which is obtained by a second embodiment of the present invention.

FIG. 2 shows a filter composed of a porous ceramic body which is produced by a second embodiment of the present invention.

In order to obtain the filter shown in FIG. 2, four pieces of polyurethane foamed bodies having such a shape as to be obtained by radially splitting a columnar body at right angles and having cell density of 13 mesh, a pillar-shaped polyurethane foamed body having a cross shaped section and cell density of 40 mesh, and a sheet-shaped polyurethane foamed body having cell density of 40 mesh, were prepared.

These bodies were assembled as shown in FIG. 2. Then, the obtained composite body was subjected to the repeated cycles of the operations of immersing the composite body into the ceramic slurry, taking the composite body out of the slurry and drying the composite body, and then the dried composite body was fired in the same method as that of the first embodiment.

As a result, a filter composed of porous portions 11, 12, 13 and 14 and non or only slightly porous portions 21 and 22 was obtained.

Mechanical strength of the obtained filter in the axial direction and the radial direction thereof was more excellent than that of the filter obtained in the first embodiment.

Figure 3:
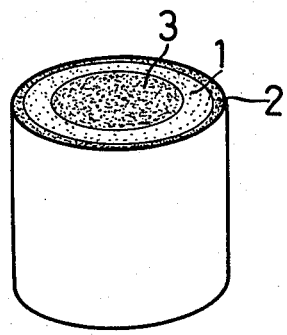
FIG. 3 is a perspective view of a porous ceramic which is obtained by a third embodiment of the present invention.

FIG. 3 shows a filter composed of a porous ceramic body which is obtained by a third embodiment of the present invention.

In order to produce such a filter as shown in FIG. 3, a columnar polyurethane foamed body having cell density of 18 mesh, a cylindrical polyurethane foamed body having such a size and a shape as to closely fit the outer periphery of the columnar polyurethane foamed body and having cell density of 13 mesh, and a sheet-shaped polyurethane foamed body having cell density of 40 mesh, were prepared.

These bodies were assembled as shown in FIG. 3. Then, the obtained composite body was subjected to the repeated cycles of the operations of immersing the composite body into a ceramic slurry and drying the composite body, and then the dried composite body was fired. As a result, a filter composed of a cylindrical portion 1 having lowest apparent density, an outer peripheral portion 2 having highest apparent density and a columnar portion 3 of which apparent density is higher than that of the cylindrical portion 1 and lower than that of the outer peripheral portion 2, was obtained.

The flowing speed of the exhaust gas flowing through the exhaust pipe of a vehicle is highest in the axially central portion thereof.

According to the third embodiment of the present invention, the apparent density of the central portion of the filter is made higher than that of the cylindrical portion 1.

Therefore, when the filter of the third embodiment is installed within the exhaust pipe, the exhaust gas does not flow through the central portion of the filter at high speed so that the flowing speed of the exhaust gas becomes uniform over the whole cross section of the filter. Consequently, exhaust gas purifying efficiency is improved.

Figure 4:
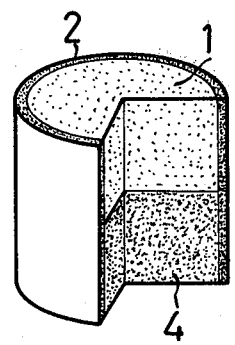
FIG. 4 is a partially cut away perspective view of a porous ceramic body which is obtained by a fourth embodiment of the present invention.

FIG. 4 shows a filter composed of a porous ceramic body which is obtained by a fourth embodiment of the present invention.

In order to produce such a filter as shown in FIG. 4, a first columnar polyurethane foamed body having cell density of 13 mesh and a second columnar polyurethane foamed body having the same diameter and the same length as those of the first columnar polyurethane foamed body and having cell density of 20 mesh and a sheet-shaped polyurethane foamed body having cell density of 40 mesh, were prepared.

The first columnar foamed body was put on the second columnar foamed body coaxially and the sheet-shaped polyurethane foamed body was wound round the first and the second foamed bodies. As a result, a composite body was produced.

The obtained composite body was repeatedly subjected to seven times of cycles of the operations of immersing the obtained composite body into a slurry bath which was prepared by mixing 1500 g of cordierite powder, 60 g of methyl cellulose and 3000 ml of water, taking the composite body to which the slurry was attached, out of the slurry bath, blowing off the excess slurry from the composite body, and drying the composite body at 100° C. for 3 hours.

Then, the obtained composite body to which the slurry was attached was fired at 1300° to 1480° C. for 5 hours.

Consequently, a filter integrally composed of a columnar porous portion 1 having lowest apparent density, a columnar porous portion 4 having higher apparent density than that of the columnar porous portion 1 and a surrounding portion 2 having highest apparent density, was obtained.

Figure 5:
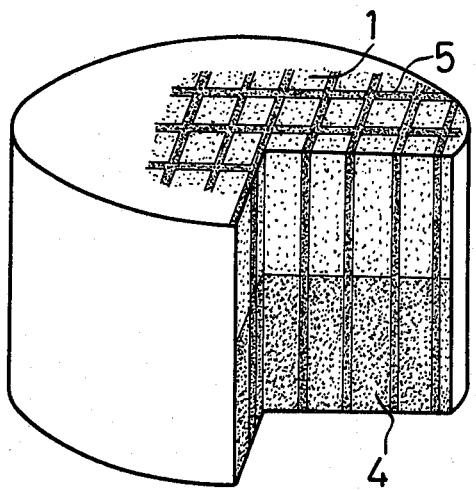
FIG. 5 is a partially cut away perspective view of a porous ceramic body which is obtained by a fifth embodiment of the present invention.

FIG. 5 shows a filter which is obtained by a fifth embodiment of the present invention.

In order to produce such a filter as shown in FIG. 5, a slurry prepared by mixing and kneading 1500 g of cordierite powder, 100 g of methyl cellulose, 450 ml of water, was extruded into a honeycomb structure, and the obtained honeycomb structure was dried.

Polyurethane foamed bodies having cell density of 13 mesh and 20 mesh respectively were produced in the same method as shown in the fourth embodiment.

And these foamed bodies were cut into a large number of pillar shaped bodies having such a shape and a size as to closely fit each open passage of the honeycomb structure. The length of each pillar shaped body is a half of that of each open passage of the honeycomb structure.

Then, the pillar shaped bodies having cell density of 13 mesh, were inserted into the open passages from one side thereof and the pillar shaped bodies having cell density of 20 mesh were inserted into the open passages from the other side thereof. As a result, a composite body which was composed of a ceramic honeycomb structure and a large number of pillar shaped bodies, was obtained.

The obtained composite body was subjected to the repeated cycles of the operations of immersing the composite body into a cordierite slurry and drying the composite body, and then the dried composite body was fired at 1300° to 1480° C. for 5 hours in the same method as that of the fourth embodiment.

As a result, a filter composed of a ceramic honeycomb structure 5, porous portions 1 having low apparent density and porous portions 4 having high apparent density, was obtained.

The filters obtained in the fourth embodiment and the fifth embodiment were installed in the exhaust pipe of a diesel engine respectively and used as filters for catching carbon particulates discharged from the diesel engine. Each filter was installed in the exhaust pipe so that the porous portion or portions 1 having lower apparent density were positioned on the upstream side of the exhaust pipe.

The carbon particulates catching efficiency and pressure loss of each filter were measured.

At the same time, similar measurements were made to the filter composed only of a porous ceramic body having cell density of 13 mesh, and that composed only of a porous ceramic body having cell density of 20 mesh.

The results of the measurements are shown in the following table. These filters were installed within the exhaust pipe of a diesel engine (2000 cc) and the measurement was made after the diesel engine was operated at 1000 rpm under no load for 60 minutes.

|  | Filter of the Present Invention | | 13 mesh Filter | 20 mesh Filter |
| --- | --- | --- | --- | --- |
|  | A | B |  |  |
| Carbon Particulates Catching Efficiency (%) | 50 | 50 | 35 | 55 |
| Pressure Loss (mmAq) | 310 | 330 | 250 | 430 |

As is well known from the experimental results shown in the above table, the carbon particulates catching efficiency of the filters of the present invention is higher than that of the filter of 13 mesh and approximates to that of the filter of 20 mesh, and pressure loss of the filters of the present invention is lower than that of the filter of 20 mesh. This experimental result is caused by the fact that relatively large carbon particulates are caught by the porous portion 1 having low apparent density and that relatively small carbon particulates are caught by the porous portion 4 having high apparent density.

Compression strength of the filter obtained in the fourth embodiment of the present invention was 100 to 150 kg/cm$^2$ in the axial direcion thereof, 50 to 100 kg/cm$^2$ in the radial direction thereof, and 10 to 20 kg/cm$^2$ in the oblique direction thereof and that of the filter obtained in the fifth embodiment of the present invention was 150 to 200 kg/cm$^2$ 50 to 100 kg/cm$^2$, 10 to 20 kg/cm$^2$ respectively.

Next, the filters of the fourth and the fifth embodiments were coated with γ-alumina, and similar measurements were made of the obtained coated filters.

As a result, the carbon particulates catching efficiency was 65% and 65% respectively and the pressure loss was 330 mmAq and 350 mmAq respectively.

Thus, by coating the filter with γ-alumina, the carbon particulates catching efficiency is largely increased but the pressure loss is scarcely increased.

Figure 6:
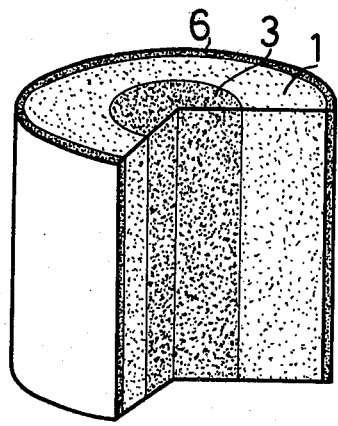
FIG. 6 is a partially cut away perspective view of a porous ceramic body which is obtained by a sixth embodiment of the present invention.

FIG. 6 shows a filter which is obtained by a sixth embodiment of the present invention.

In order to produce such a filter as shown in FIG. 6, a cylindrical ceramic body which was formed by extruding, a cylindrical polyurethane foamed body having cell density of 13 mesh, which fitted the inner wall of the cylindrical ceramic body, and a columnar polyurethane foamed body having cell density of 18 mesh, which fitted the inner wall of the cylindrical polyurethane foamed body, were prepared.

These bodies were assembled to form a composite body as shown in FIG. 6. Then, the obtained composite body was subjected to the repeated cycles of the operations of immersing the composite body into the ceramic slurry bath and drying the composite body, and the dried composite body was fired.

As a result, a filter having unitary structure composed of a porous portion 1 having lower apparent density, a porous portion 3 having higher apparent density, and an outer peripheral portion 6 surrounding the porous portion 1, was obtained.

In this filter of the sixth embodiment, mechanical strength thereof can be increased by virtue of the outer peripheral portion 6, and the exhaust gas purifying efficiency thereof can be improved by virtue of the porous portion 3 having high apparent density which is positioned in the central portion of the filter.

In the preceding embodiments, the preferable apparent density of the most porous portion 1 or portions 11, 12, 13 and 14 of the obtained filter is 0.30 to 0.50 kg/cm$^3$, that of the axially central portion 3 is 0.35 to 0.55 g/cm$^3$ and that of the downstream positioned portion 4 is 0.35 to 0.55 g/cm$^3$.

According to the present invention, alumina mullite, spodumene or zirconia can be used as the ceramic material in place of cordierite.

As the material of the foamed body to which ceramic slurry is attached for producing a ceramic porous body, such a synthetic resin as can be formed into a foamed body and can be burnt off at the sintering temperature of the ceramic can be used in place of polyurethane.

For example, polyvinyl chloride resin, urea resin polyolefine or polystyrene will do.

As described above, according to the present invention, a ceramic porous body having partially different apparent densities can be easily produced.

Furthermore, each portion of the ceramic body can be formed so as to have a desired apparent density.

The ceramic porous body which is obtained by the present invention can be effectively used as the filter for purifying exhaust gases discharged from an internal combustion engine. In this case, by forming the outer peripheral portion of the filter so as to have highest apparent density, the mechanical strength thereof can be improved. And by forming the axially central portion of the filter so as to have apparent density higher than that of the portion theround, or by aligning the porous portion having relatively higher apparent density and the porous portion having relatively lower apparent density in the axial direction, exhaust gas purifying efficiency can be improved.

As described above, according to the present invention, ceramic filters having excellent mechanical strength and exhaust gas purifying efficiency can be produced.

Having now fully described the invention, it will be apparent to one of ordinary skill in the art that many changes and modifications can be made thereto without departing from the spirit or scope of the invention as set forth herein.

What is claimed is:

1. A method for producing a filter for purifying exhaust gases discharged from an internal combustion engine of an automobile or the like, comprising the steps of:
    preparing at least two kinds of foamed bodies made of an organic compound;
    said foamed bodies having different cell densities from each other and being provided with pores communicated with one another respectively;
    assembling said at least two kinds of foamed bodies into a columnar composite body so that said foamed body having highest cell density is positioned in the outer peripheral portion of said columnar composite body;
    immersing said composite body into a ceramic slurry bath for attaching said ceramic slurry to said composite body;
    removing said composite body from the bath with ceramic slurry attached thereto;
    drying said composite body to which said ceramic slurry is attached;
    repeating said immersing and said drying steps until the pores of said foamed-body positioned in the outer peripheral portion are substantially clogged with said ceramic slurry while the permeability of said foamed body positioned in the central portion is maintained; and
    firing said composite body to which said ceramic slurry is attached to burn off said organic compound and sinter said ceramic slurry;
    whereby a filter is obtained for purifying exhaust gases, which is composed of a reinforcing wall and a gas-permeable portion and has a unitary structure of partially different apparent densities.

2. A method for producing a filter according to claim 1, wherein:
    said organic compound is selected from the group consisting of polyurethane, polyvinyl chloride resin, urea resin, polyolefin and polystyrene.

3. A method for producing a filter according to claim 1, wherein:
    said ceramic is selected from the group consisting of cordierite, alumina, mullite, spodumene and zirconia.

4. A method according to claim 1, wherein:
    said at least two kinds of foamed bodies are composed of a sheet shaped first foamed body having higher cell density and a columnar second foamed body having lower cell density; and
    said composite body is formed by winding said sheet shaped first foamed body round the outer peripheral surface of said columnar second foamed body;

5. A method according to claim 4, wherein:
    the apparent density of the central portion of said obtained filter corresponding to the second foamed body is 0.30 to 0.50 g/cm$^3$.

6. A method according to claim 1, wherein:
    said at least two kinds of foamed bodies are composed of a sheet shaped first foamed body having higher cell density, a pillar shaped second foamed body having a cross shaped section and having the same cell density as that of said first foamed body and four pillar shaped third foamed bodies having lower cell density, and having such a shape and size as to be obtained by radially splitting a columnar body by a right angle; and
    said composite body is formed by closely inserting said third foamed bodies into the spaces defined by said second foamed body and winding said first foamed body round the outer peripheral surface of said second foamed body and said third foamed bodies.

7. A method according to claim 6, wherein:
    the apparent density of the portions of said obtained filter, corresponding to the third foamed bodies is 0.30 to 0.50 g/cm$^3$.

8. A method according to claim 1, wherein:
    said at least two kinds of foamed bodies are composed of a sheet shaped first foamed body having highest cell density, a cylindrical second foamed body having lowest cell density and a columnar third foamed body having cell density lower than that of said first foamed body and higher than that of said second foamed body, of which outer diameter is equal to the inner diameter of said second foamed body; and
    said composite body is formed by closely inserting said third foamed body into said second foamed body and winding said first foamed body round the outer peripheral surface of said second foamed body.

9. A method according to claim 8, wherein:
    the apparent density of the portion of said obtained filter, corresponding to the second foamed body is 0.30 to 0.50 g/cm$^3$, and that of the portion corresponding to the third foamed body is 0.35 to 0.55 g/cm$^3$.

10. A method according to claim 1, wherein:
    said at least two kinds of foamed bodies are composed of a sheet shaped first foamed body having highest cell density, a columnar second foamed body having lowest cell density, and a columnar third foamed body having cell density lower than that of said first foamed body and higher than that of said second foamed body, said second foamed body and said third body having the same outer diameter as each other; and
    said composite body is formed by coaxially putting said second foamed body on said third foamed body and winding said first foamed body round the outer peripheral surface of said second foamed body and said third foamed body.

11. A method according to claim 10, wherein:
    the apparent density of the portion of said obtained filter, corresponding to the second foamed body is 0.30 to 0.50 g/cm$^3$, and that of the portion corresponding to the third portion is 0.35 to 0.55 g/cm$^3$.

12. A method for producing a filter for purifying exhaust gases comprising the steps of:
    preparing a cylindrical ceramic body by extrusion forming and two kinds of foamed bodies composed of organic compound which have different cell densities from each other and are provided with pores communicated with one another;

assembling said cylindrical ceramic body and said two kinds of foamed bodies into a composite body by coaxially inserting said two kinds of foamed bodies within said cylindrical ceramic body;

immersing said composite body into a ceramic slurry bath composed of the same material as that of said cylindrical ceramic body for attaching said ceramic slurry to said composite body; and firing said composite body to which said ceramic slurry is attached, to burn off said organic compound and sinter said ceramic slurry.

13. A method according to claim 12, wherein:

said cylindrical ceramic body is provided with grid-shaped thin walls defining a large number of axially extending open passages;

said two kinds of foamed bodies are composed of a first group of foamed bodies having lower cell density, which have such a shape and a size as to be closely inserted within said open passages of said cylindrical ceramic body; and a second group of foamed bodies having higher cell density, which have such a shape and a size as to be closely inserted within said open passages of said cylindrical ceramic body; and said composite body is formed by inserting said first group of foamed bodies and said second group of foamed bodies in stacked relation in said open passages.

14. A method according to claim 12, wherein:

said cylindrical ceramic body is provided with an inner wall defining one open passage;

said two kinds of foamed bodies are composed of a cylindrical first foamed body having lower cell density, and an outer diameter equal to the inner diameter of said cylindrical ceramic body, and a columnar second foamed body having higher cell density of which outer diameter is equal to the inner diameter of said cylindrical first foamed body; and said composite body is formed by coaxially inserting said cylindrical first foamed body and said columnar second foamed body within said open passage of said cylindrical ceramic body.

15. A method according to claim 13, wherein:

the apparent density of the portion of said obtained filter, corresponding to said first group of foamed bodies is 0.30 to 0.50 g/cm$^3$, and that of the portion corresponding to said second group of foamed bodies is 0.35 to 0.55 g/cm$^3$.

16. A method according to claim 14, wherein:

the apparent density of the portion of said obtained filter, corresponding to said first foamed body is 0.30 to 0.50 g/cm$^3$, and that of the portion corresponding to said second foamed body is 0.35 to 0.55 g/cm$^3$.

* * * * *